O. SHAW AND W. F. ROBERTS.
REVERSING MECHANISM FOR MACHINES CUTTING RIGHT AND LEFT HAND
HELICALS ON ROLLERS AND THE LIKE.
APPLICATION FILED AUG. 9, 1921.

1,438,405.

Patented Dec. 12, 1922.
5 SHEETS—SHEET 1.

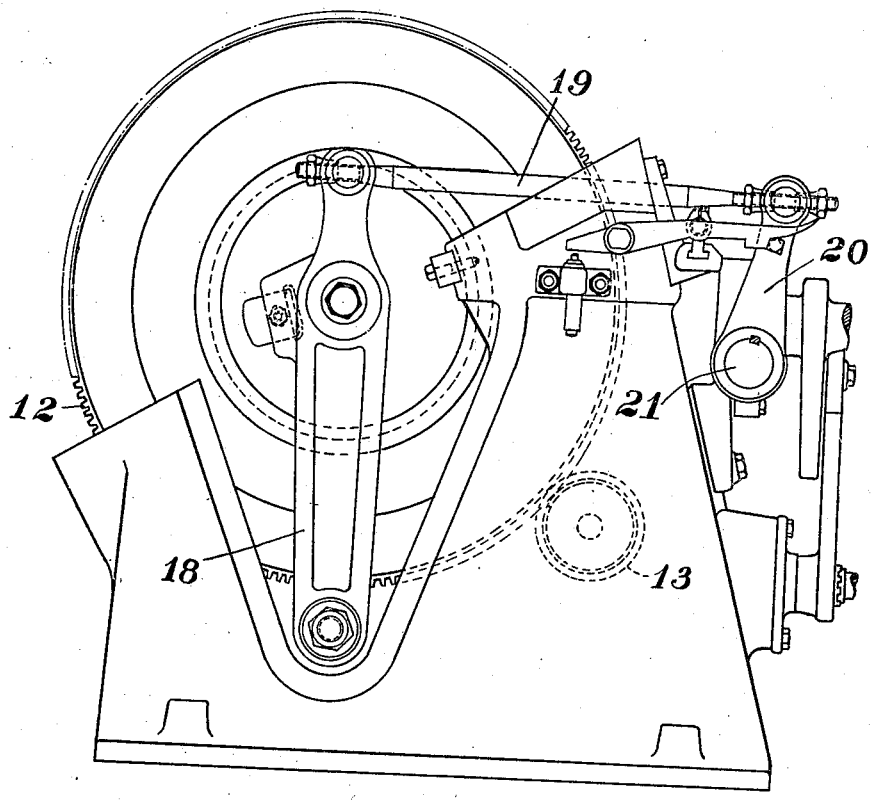

Patented Dec. 12, 1922.

1,438,405

UNITED STATES PATENT OFFICE.

OSMAN SHAW, OF STOCKPORT, AND WILLIAM FREDERICK ROBERTS, OF WALLINGTON, ENGLAND.

REVERSING MECHANISM FOR MACHINES CUTTING RIGHT AND LEFT HAND HELICALS ON ROLLERS AND THE LIKE.

Application filed August 9, 1921. Serial No. 491,044.

*To all whom it may concern:*

Be it known that we, OSMAN SHAW and WILLIAM FREDERICK ROBERTS, subjects of the King of Great Britain, residing at Stockport, Lancashire, and Wallington, Surrey, both in the Kingdom of England, respectively, have invented certain new and useful Improvements in Reversing Mechanism for Machines Cutting Right and Left Hand Helicals on Rollers and the like (for which we have filed an application in England, #5992, March 11, 1919), of which the following is a specification.

The present invention relates to improvements in machines for the cutting of helical grooves, flutes or teeth on roller or cylindrical blanks to be used for instance as rollers on washing machines for rubber or like materials, gear blanks, and the like, the helical grooves being of both right and left hand spirals and cut a diamond pattern or a chevron pattern or any pattern having a geometrical shape requiring as its basis right and left hand helicals.

The object of this invention is to provide an apparatus to trace or cut helicals of contrary direction on rollers or blanks so that the point of reverse from the helix of the one direction to the helix of the contrary direction shall take place always at a predetermined point whatever the length of either helix or in whatever geometrical combination the said helices shall be arranged.

According to this invention a pair of driven bevel wheels facing one another are automatically moved axially every half revolution or any multiple of half revolutions to bring one out of, and the other into engagement with a fixed bevel pinion. This is obtained by the periodic coupling of one or other of a pair of bevel segments connected to the said bevel wheels, with the said bevel pinion so that a small rotation of this latter will displace the cage carrying said bevel segments, laterally and consequently displace axially the two bevel wheels sufficiently to reverse the drive.

The invention is more particularly described with reference to the accompanying drawings in which:—

Figure 5 is an outside diagrammatic end view.

Figure 1:
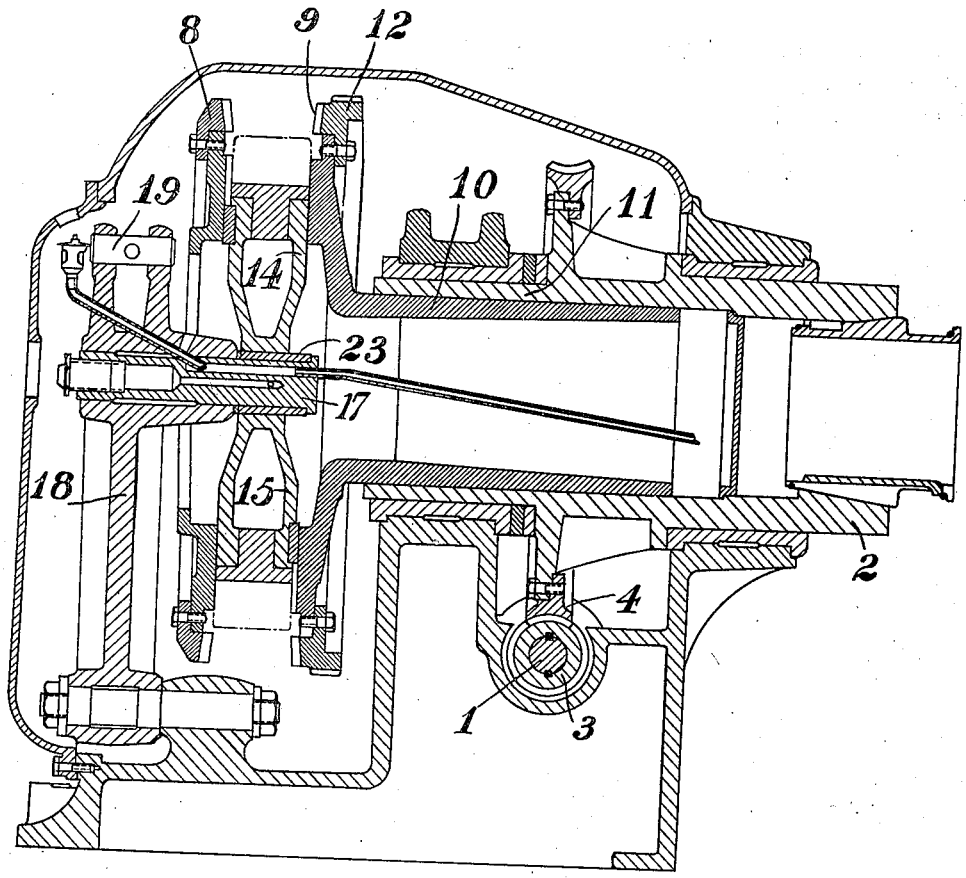
Figure 1 is a side sectional elevation.
Figure 2:
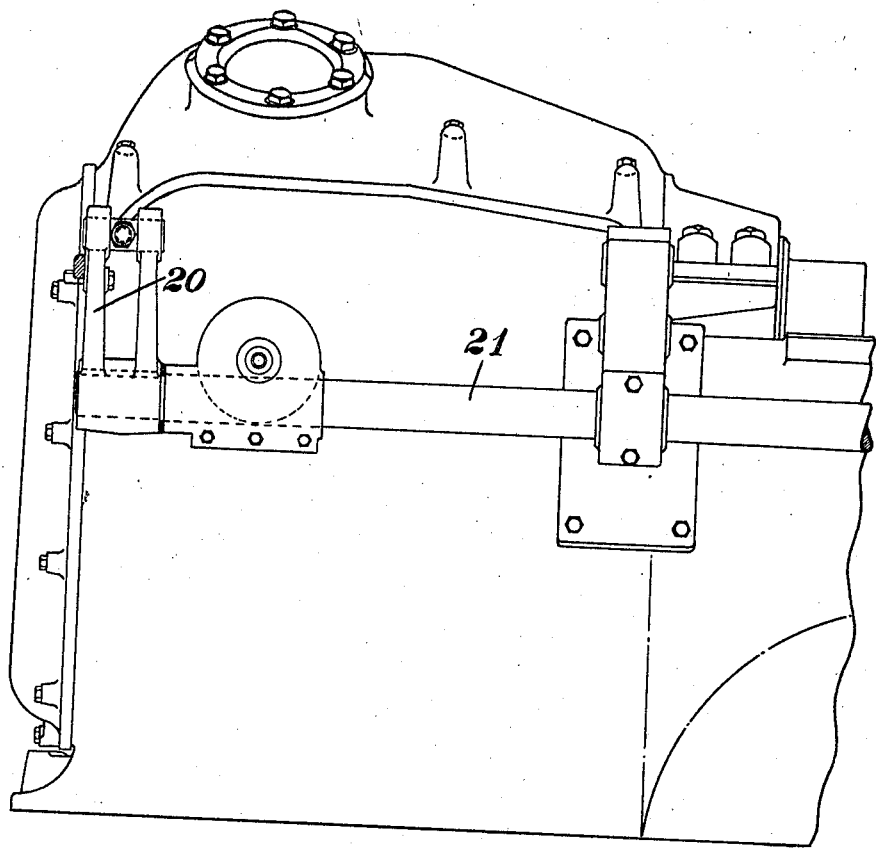
Figure 2 is a corresponding outside elevation.
Figure 3:
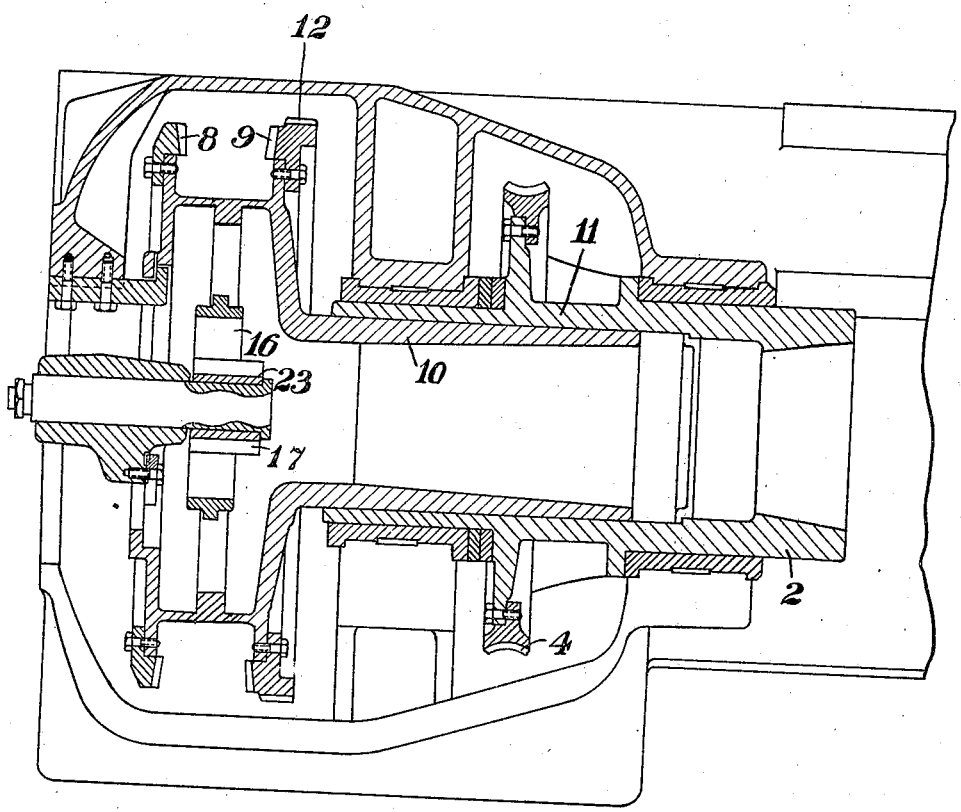
Figure 3 is a corresponding plan view.
Figure 4:
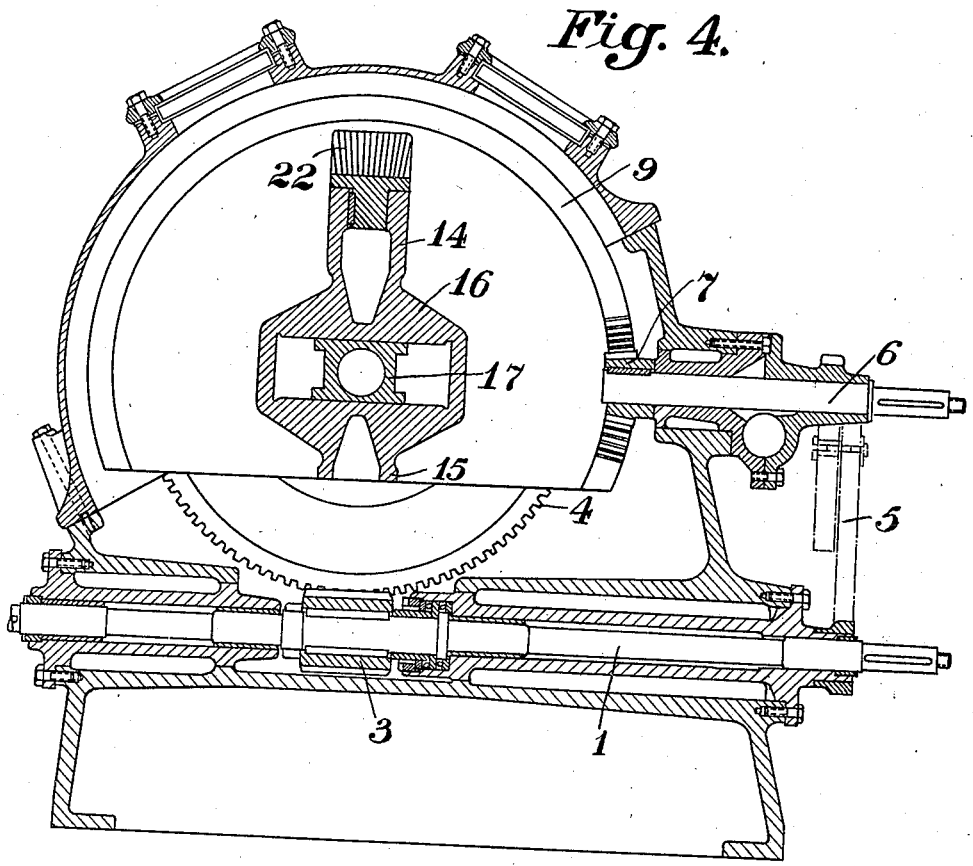
Figure 4 is a sectional end view.

In the particular arrangement illustrated by way of example in the drawings the main driving shaft 1, drives the headstock 2, of the machine tool through worm and worm wheel gearing 3, 4, and also drives through gearing 5, the countershaft 6, having at its inner end a bevel wheel 7, meshing alternately with a pair of bevel crown wheels 8, 9. These wheels are mounted on a sleeve 10, which can slide in a long bearing in a hollow driving sleeve 11 and can also rotate freely therein. The bevel wheel 9, also has a spur crown wheel 12, meshing with a pinion 13, on a shaft driving the traverse of the tool so that whenever the motion of the crown wheel 12, is reversed so also will be the motion of the tool or the like part.

The sleeve 10 carrying the bevel wheels 8 and 9 is bored radially to receive a sliding extension 14, 15, of a cage or spider 16, mounted on a sliding block or slipper 17. This sliding block is carried on a pivoted fork 18, connected to a connecting rod 19, swivelling on a link 20 which is keyed in turn to the shaft 21. This shaft 21, extends along the machine tool and is connected to fingers which will be arranged in the path of stops on the tool slide or the like so that when this has reached the end of a traverse the shaft 21, will be oscillated through a predetermined angle to turn the arm 20 and thus move the bracket 18, about its pivot to displace the sliding block 17, on one side or other of a position concentric with the crown bevel wheels 8, 9. Owing to this the concentric movement of the slide 17, the guide parts 14, 15, will slide radially outwards in one direction or the other along radial guides in the sleeve 10, and will consequently bring one or other of a pair of bevel segments 22, into mesh with either of the wheels 8 or 9. These bevel segments are eccentrically mounted to the axis of the radial extensions 14, 15, so that directly they are brought into mesh with for instance the gear wheel 9, owing to the motion of this, the bevel wheel 22, for instance will be turned about its axis and consequently displace the cage carrying the extensions 14, 15, along the axial guide 23. Now, as the extensions 14, 15, are sliding in radial guides in the sleeve 10, this also will be displaced to one side and so bring the bevel wheel 8, in this instance, out of engagement with the driving bevel 7, and bring the bevel wheel 9, into driving engagement with this wheel 7, so that it will be seen that the drive is automatically reversed and what is a particular feature of this invention is that, any number of revolutions of the wheel 13, can be effected from the crown driving wheel 12, that is to say any degree of length of traverse can be obtained before reversal takes place.

We declare that what we claim is:—

1. A driving gear comprising in combination a driving element, a driven element, a pair of wheels intermediate said elements adapted to rotate in opposite directions and connected together, a driving connection between both of said wheels and one of said elements, a gear connection between the other element and one of said two wheels at a time only, means to automatically displace the gear connection from one wheel to the other when it is desired to reverse the drive and means to positively displace said gear connection by gearing automatically clutched to the opposite driving wheel to that with which the drive will be established.

2. A driving gear comprising in combination a pair of bevel crown wheels positively disposed relatively to one another, a driving connection for said bevel crown wheels, a guide for supporting said bevel crown wheels to slide axially together, a bevel wheel on an axis at right angles to said bevel crown wheels and intermediate them to rotate about a fixed axis, power driven means from one of said bevel wheels at a time to automatically displace said crown bevel wheels axially to bring one of said crown bevel wheels out of and the other into engagement with said bevel wheel.

3. A driving gear comprising in combination a pair of bevel crown wheels positively disposed relatively to one another, a driving connection for said bevel crown wheels, a guide for supporting said bevel crown wheels to slide axially together, a bevel wheel on an axis at right angles to said bevel crown wheels and intermediate them to rotate about a fixed axis, a spider concentric with said crown bevel wheels, radial guides in said crown bevel wheels engaged by said spider a pair of positively displaced eccentrically mounted bevel segments on said spider and means to displace said spider radially when it is desired to reverse the drive by bringing one bevel segment into engagement with one crown wheel to displace it axially.

4. A driving gear comprising in combination a pair of bevel crown wheels positively disposed relatively to one another, a driving connection for said bevel crown wheels, a guide for supporting said bevel crown wheels to slide axially together, a bevel wheel on an axis at right angles to said bevel crown wheels, and intermediate them to rotate about a fixed axis, a spider concentric with said crown bevel wheels, radial guides in said crown bevel wheels engaged by said spider, a pair of positively displaced eccentrically mounted bevel segments on said spider, a slipper engaging in a guide extending on either side of the centre of said spider and means to displace said slipper when it is desired to reverse the drive.

5. A machine tool comprising in combination a head stock, means to drive said head stock continuously in one direction, a tool feeding shaft, a driving element therefor, a driven element therefor, a pair of bevel crown wheels positively disposed relatively to one another, a driving connection for said bevel crown wheels, a guide for supporting said bevel crown wheels to slide axially together, a bevel wheel on an axis at right angles to said bevel crown wheels and intermediate them to rotate about a fixed axis, a spider concentric with said crown bevel wheels, radial guides in said crown bevel wheels engaged by said spider, a pair of positively displaced eccentrically mounted bevel segments on said spider, a slipper engaging in a guide extending on either side of the centre of said spider and stops operating on the bed of the machine tool to automatically displace the slipper to reverse the drive when desired.

In witness whereof, we have hereunto signed our names this 24th day of June 1921, in the presence of two subscribing witnesses.

OSMAN SHAW.
WILLIAM FREDERICK ROBERTS.

Witnesses:
HEATH ARMSTRONG,
JOHN McLACHLEN.